United States Patent [19]

Chen et al.

[11] 4,173,832
[45] Nov. 13, 1979

[54] EDUCATIONAL TOY

[76] Inventors: Lim B. Chen; Lim L. Cher, both of Sunway Garden, F2 17th Floor, 989 King's Rd., Hong Kong, Hong Kong

[21] Appl. No.: 886,633

[22] Filed: Mar. 15, 1978

[30] Foreign Application Priority Data

Mar. 25, 1977 [GB] United Kingdom ............... 12593/77

[51] Int. Cl.² .............................................. G09B 7/06
[52] U.S. Cl. .................................................... 35/9 B
[58] Field of Search ................ 35/8 R, 9 R, 9 B, 9 C, 35/9 D, 35 R, 35 D

[56] References Cited

U.S. PATENT DOCUMENTS

| 2,062,453 | 12/1936 | Hastings | 35/9 B |
| 2,213,411 | 9/1940 | Rippon | 35/9 R |
| 2,498,578 | 2/1950 | Reinnagel | 35/9 B X |
| 2,983,053 | 5/1961 | Bartholomew et al. | 35/9 B |
| 3,081,560 | 3/1963 | Campoagud | 35/35 R |
| 3,100,352 | 8/1963 | Boissevain | 35/9 C |
| 3,673,707 | 7/1972 | Manning | 35/35 D |
| 3,902,256 | 9/1975 | Liu | 35/9 D |
| 3,973,334 | 8/1976 | Sterritt | 35/35 R |

Primary Examiner—William H. Gries
Attorney, Agent, or Firm—Parmelee, Miller, Welsh & Kratz

[57] ABSTRACT

The invention relates to an educational toy in which a child is taught to read by association of a written word with an image. In operation the toy has a learning phase in which the image and the corresponding word are displayed and a testing phase in which the word is hidden and a choice of words is presented to the child for selection of the appropriate word.

18 Claims, 7 Drawing Figures

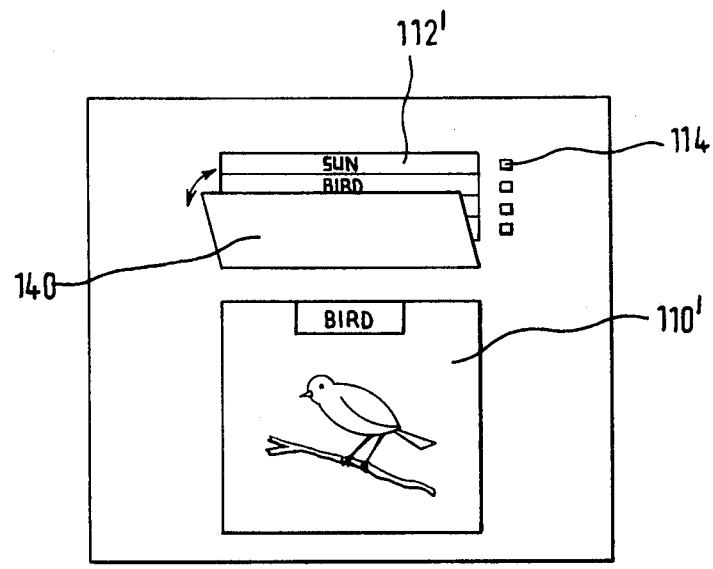
FIG. 5.
FIG. 6.
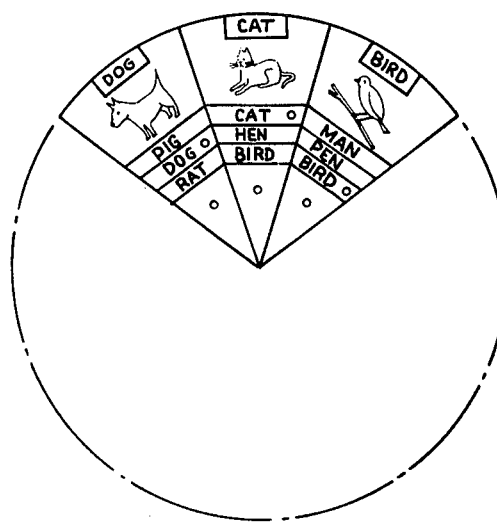
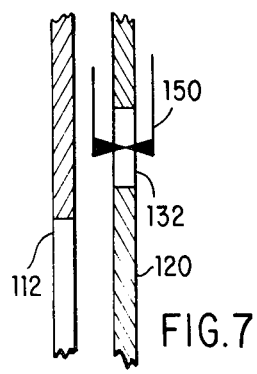
FIG. 7

4,173,832

EDUCATIONAL TOY

The present invention relates to games, and is particularly concerned with an educational toy for assisting young children in reading.

In accordance with a first aspect of the present invention, there is provided an educational toy which comprises a first set of windows, a first set of keys each selectively operable to cause one of a plurality of first images to be displayed in a respective one of the windows of the first set and to cause a simultaneous display of an associated one of a plurality of second images in a second set of display windows for a predetermined length of time, a second set of keys, each having as a label a respective one of said second images and selectively operable at the end of the said predetermined length of time, and means for indicating correspondence and non-correspondence between the label of the selected key of the second set and the image display in the window of said first set.

In accordance with a second aspect of the present invention, there is provided an educational toy which includes a display panel and an image carrier movable relative to the display panel, wherein the image carrier is formed with a plurality of sections each having a first image, a second image associated with the first image, and a plurality of third images of which only one corresponds to the second image and wherein the display panel is arranged to display the images on the image carrier section by section and includes a first window area for displaying the first image, a second window area for displaying the second image, a third window area for displaying the said plurality of third images and a plurality of keys each associated with a respective one of the plurality of third images and arranged to be depressed by the user to test for correct assimilation of the information in the images, means being provided for indicating correspondence between the image associated with the selected key and the said second image.

Preferably, means are provided for enabling the images in the second window area and the third window area to be displayed sequentially but not simultaneously. The said means may comprise light sources which are energized sequentially or may comprise a flap pivotably mounted on the display panel to expose only one window area at a time.

Conveniently, the film carrier is formed of an insulating material and is arranged to pass between contact associated with the said keys and is provided with an aperture only alongside the third image corresponding to the second image whereby only the contacts of the key associated with the correct one of the third images may be brought together upon manual actuation of the associated key.

Conveniently, a further set of contacts is provided on the display between which contacts the image carrier is inserted, the image carrier being formed with further apertures which are arranged such that the said further contacts are closed when each section is aligned with the windows of the display panel. The said further contacts may constitute a switch for energizing a light source arranged beneath the first image.

The image carrier may conveniently be in the form of a wound tape but alternatively a rotatable disc may be employed.

The invention will now be described further, by way of example, with reference to the accompanying drawings, in which.

Figure 3:
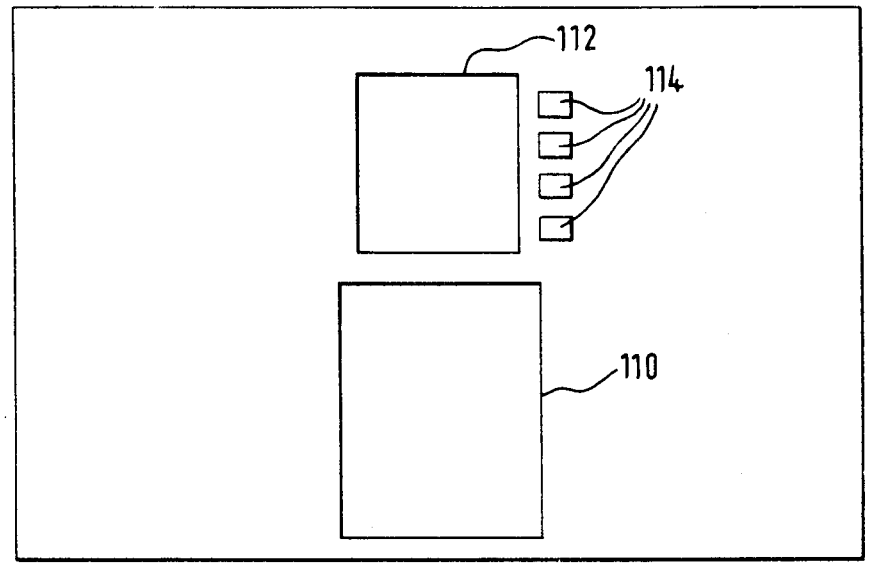
Figure 4:
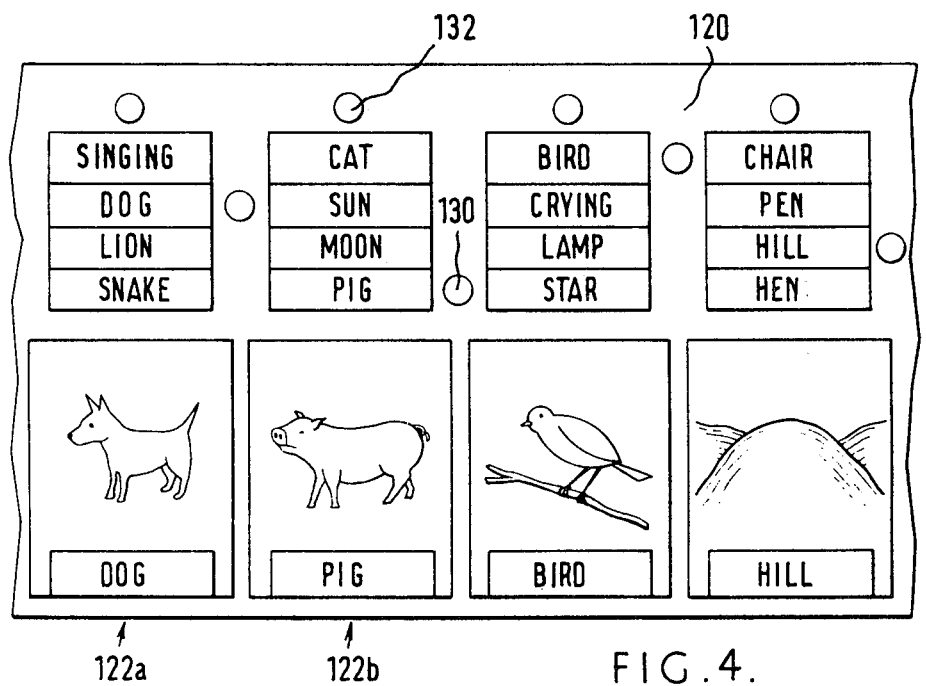

FIG. 3 shows a display panel of an educational toy in accordance with a second embodiment of the invention, FIG. 4 shows an image carrier having a plurality of sections which are selectively alignable with the windows of the display panel in FIG. 3, FIG. 5 shows a display panel in accordance with a further embodiment of the invention, FIG. 6 shows the image carrier of a further embodiment of the invention, and FIG. 7 is an enlarged section through a portion of the embodiment of the invention shown in FIGS. 3 and 4.

Figure 1:
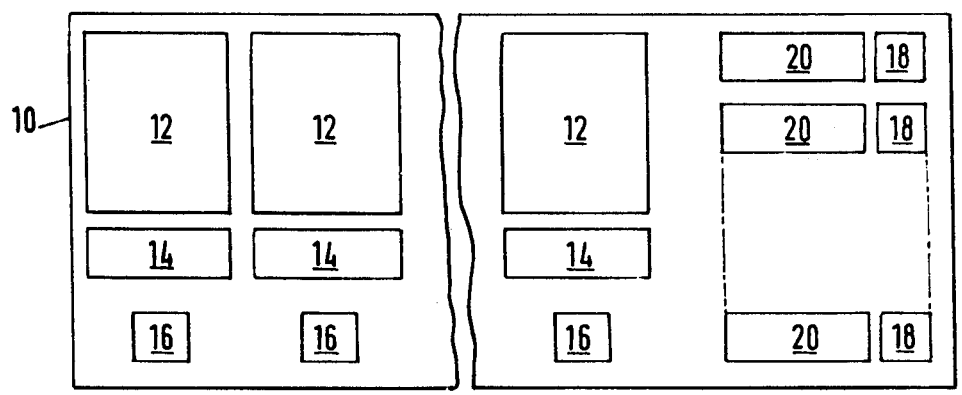
FIG. 1 shows schematically a toy in accordance with a first embodiment of the present invention.

Referring to FIG. 1, the toy has a housing 10 which includes a first set of windows each designated 12. Beneath each of the windows 12 there is a respective window 14 and a respective key 16. The windows 12 are herein referred to as the first set, windows 14 as the second set, and the keys 16 as the first set of keys. The images displayed in the windows 12 are termed first images and the images in the windows 14 are termed second images. When one of the keys 16 is depressed, the window 12 and the window 14 above it light up, the window 14 being arranged to flash on and off. For example, the first image displayed in window 12 may be a cat and the second image may be the word C A T. When the key is depressed, the word C A T flashes to show that the word is descriptive of the displayed picture.

After a predetermined length of time, the window 14 stops flashing and a light goes on to light up a third set of windows 20 simultaneously. The third set of windows carry second images corresponding to the second images displayed in the windows 14 but arranged in random order. Each of these windows 20 serves as a label for a key 18 of a second set. Whilst the windows 20 are illuminated, the child operates the key 18 adjacent the appropriate second image, in the case of the example being the key labelled C A T. If the correct key is operated, showing that the child has correctly associated the word C A T with the picture of a cat, a correct indication is produced. Such an indication may be in the form of a piece of music or a performance by a toy such as a tiny toy monkey mounted on the casing 10. If on the other hand the incorrect key 18 is depressed a sound is produced to show that a wrong choice has been made and at the same time the correct choice is made to twinkle again.

Thus the operation of the toy may be considered as comprising two distinct stages, the first, when a key 16 is actuated, being a learning stage in which the child is taught to associate the picture with a word and the second, when a key 18 is operated, serving as a testing stage to ensure that the information has been correctly assimilated.

Figure 2:
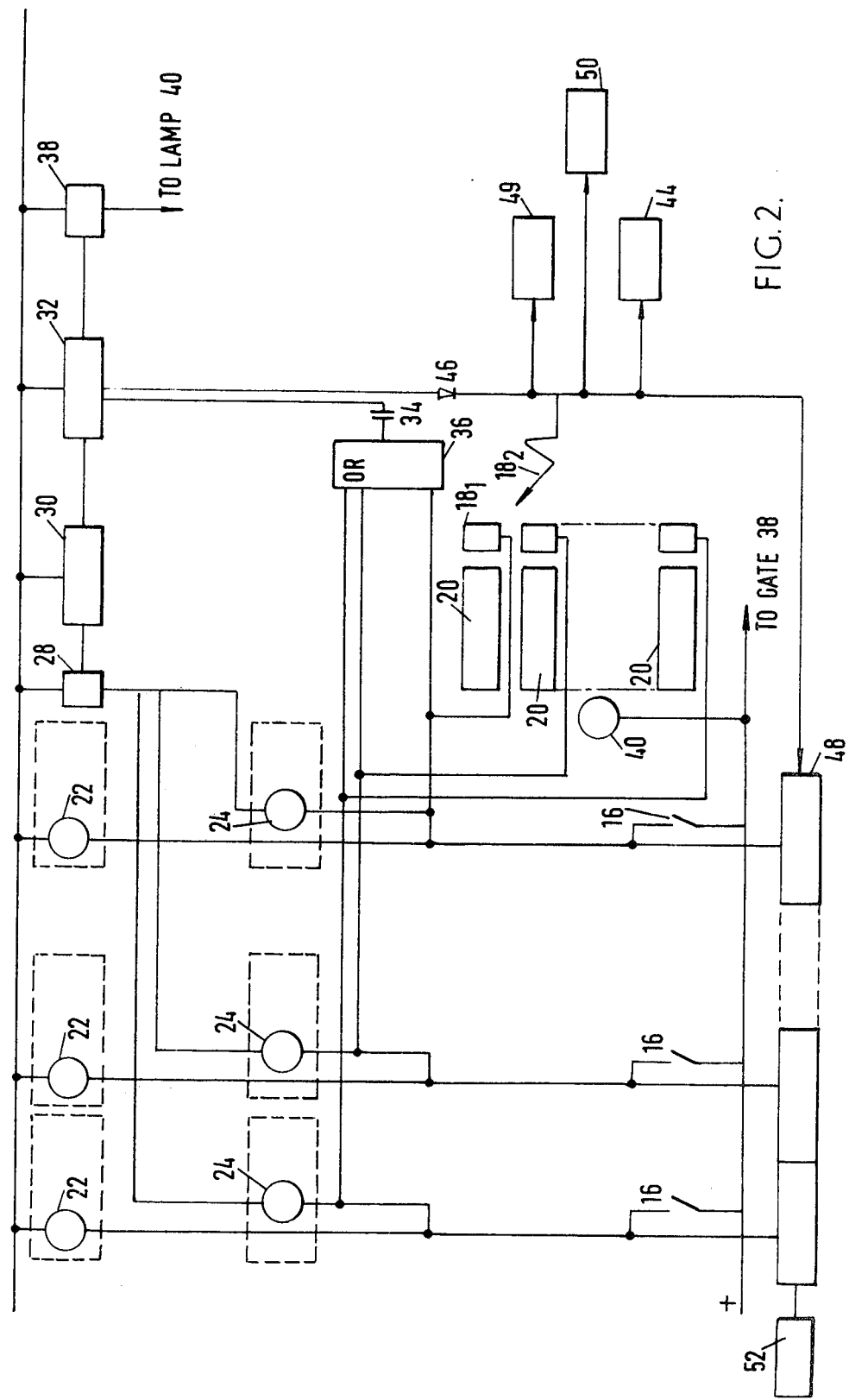
FIG. 2 is a block diagram of the electrical circuit of the toy in FIG. 1.

Referring now to FIG. 2, lamps 22 are the lamps disposed beneath the windows 12. Each of these is connected in series with a respective one of the key operated switches 16 across a positive and negative supply rail. The key 16 is also connected to a second set of lamps 24 which are disposed beneath the windows 14, the lamps being further connected by way of a gate 28 to the negative supply rail. The gate 28 is controlled by a controllable square wave generator 30 which is in turn controlled by a monostable multibibrator 32 triggered by way of a capacitor 34, by an OR gate 36 connected to all the key switches 16. Thus, when a switch 16 is closed, its associated lamp 22 is lit and a trigger signal is applied by way of the OR gate 36 and the capacitor 34 to the multivibrator 32 which now is triggered into its quasistable state. During this time, the square wave generator 30 produces a square wave which periodically opens and closes the gate 28 to connect the lamp 24 associated with the operated key 16 intermittently across the power supply so that this lamp flashes on and off. After a short while, the monostable multivibrator 32 returns to its stable state in which state it controls a second gate 38 which energizes a lamp 40 arranged beneath all the windows 20 so that the labels associated with the keys 18 are illuminated.

In FIG. 2 the keys 18 have the form of a set of metallic contacts $18_1$ which are contacted by a metallic pen $18_2$. When the pen $18_2$ touches one of the contacts $18_1$ a positive potential will appear on the pen $18_2$ if the key 16 to which the contact $18_1$ is connected is closed whereas a negative potential will appear if the switch is open, the negative potential being by virtue of the connection through the lamp 22. If a positive potential appears, then a correct indicator 49 produces a piece of music and/or causes movement of a toy figure such as a toy monkey. If on the other hand, a negative potential is sensed by the pen $18_2$, a wrong indicator 44 is energized and at the same time the multivibrator 32 is re-triggered through a diode 46 again to energize the correct one of the lamps 24.

The toy is additionally provided with a shift register 48, a counter 50, and a power on and reset unit 52. When the power is switched on a binary "1" is set in the first stage of the shift register 48 and the counter 50 is reset. Each of the stages of the shift register 48 is connected across a respective one of the switches 16 so that a "1" set in a stage is electrically equivalent to closing of the associated switch 16. Each time a contact is touched by the pen $18_2$, the shift register 48 is shifted one to the right and the next lamp 22 is illuminated. In this way the child may be examined as to its understanding of all the images displayed in the toy. With each correct answer, the mark counter 50 may increment its count by 10 and with each incorrect answer the count may be decremented by 5. In this manner, the toy may be used for examining as well as for teaching.

The switches 16 may be manually operable two position switches but they may alternatively each be constituted by a reed relay which is closable by means of a magnet inserted in a little toy such as a toy bear. As the toy is moved from one reed relay to another, the reed relay beneath the toy is closed and remains closed until the toy is moved to a different location.

The images in the various windows are carried on replaceable cards so that when a child is familiar with one set of images it may be taught a new set. In order to retain the random association between the keys 18 and the images 12, the repleacable cards may serve to complete the electrical connection between the contacts 18, and the keys 16 so that the key 18 associated with any given window 12 will depend upon the electrical connection established by the inserted card, which may conveniently carry printed conductors.

In FIG. 3 there is shown a display panel which comprises a window 110 for displaying both the first and the second images on an image carrier and as shown in FIG. 4 a second window 112 for displaying the third images. Along side the window 112 there are provided a plurality of push buttons 14 each of which actuates by means of its under surface two sets of contacts, of which one set is spaced apart by the tape.

Referring now to FIG. 4, the image carrier 120 is formed of a plurality of similar sections 122a, 122b, etc. Each section includes two associated images for example the section 122b contains a first image consisting of the picture of a pig and a second image consisting of the word "P I G."

A third set of images consists of the words "CAT, SUN, MOON, PIG" only the word "PIG" corresponding to the displayed image. Along side the word "PIG" there is a circular aperture 130 in the tape 120. Additionally, each section has an aperture 132 located centrally above the third images.

In operation, the tape 120 is inserted below the display panel of FIG. 3 and within each section the first and second images are displayed within the window 110 and the third images are displayed within the window 112. The aperture 130 falls beneath the lower most key 114 but in respect of each of the other keys the contacts are spaced from one another by the tape. A pair of normally closed contacts are provided beneath the display panel centrally above the window 112. When a section is correctly aligned, the contacts make and the picture in the window 110 lights up and at the same time a light beneath the second image that is to say the word "PIG" in respect of the section 122b this light being arranged to flash for a predetermined time. The light then goes out and then a further light comes on beneath the display window 112 to illuminate all the third images. The user should then actuate the key along side the word which he associates with the picture. If the incorrect key is actuated only one set of contacts beneath the toy will close and a wrong indication will be given. On the other hand, if the correct key is actuated then both contact sets will close for producing a sound corresponding to a correct indication. It will be appreciated from the foregoing description that the circuitry associated with the embodiment of FIGS. 3 and 4 does not differ significantly from the previously described embodiment.

In the embodiment of FIG. 5, for simplicity, in place of lights which are energized sequentially, there is pivotably mounted on the display panel a hinged flap 140 which is arranged to cover either the whole of the window 112' or the top half of the window 110'. In this embodiment, the image carrier is arranged such that the second image appears above the first image rather than beneath it as shown in FIG. 4. In use, the image carrier is first moved into a position with the flap 140 overlying the window 112' thereby allowing the second image to be viewed at the same time as the first image to teach the association to a child. When the child feels that it has learnt the word, then the flap 140 is turned to its other position to hide the second image and to expose the third images then to test correct assimilation of the information.

The embodiment of FIG. 6 is generally similar to that previously described with reference to FIGS. 3 and 4 but instead of the image carrier being in the form of a strip longitudinally displaceable to align different sections with the windows of the display panel, the image carrier is in the form of a circular disc with its sections spaced apart radially and arranged to be rotated within the image carrier. In other respects, the embodiment of FIG. 6 is believed to be readily understood in the light of the earlier description without further explanation.

As in the case of the embodiment described with reference to FIGS. 1 and 2, a mark counter may be included in the embodiments of FIGS. 3, 4, 5 and 6 for indicating the number of correct and incorrect actuations of the push button.

The embodiments described in FIGS. 3, 4, 5 and 6, may be used to form a guess game rather than an educational toy. In this case, in the first phase of operation the first and second images will be hidden from sight. A player is called upon to guess the correct push button to depress and if the correct push button is chosen then a correct first image will be displayed and the mark counter will count up the marks. If, on the other hand, an incorrect push botton is depressed, then the first image will not be displayed and a marks will be substracted from the score in the counter.

We claim:

1. An educational toy which comprises a first set of windows and a second set of windows, a first set of keys selectively operable to cause one of a plurality of first images to be displayed in the respective one of the windows in the first set and to cause a simultaneous display of an associated one of a plurality of second images in the second set of windows for a predetermined length of time, a second set of keys, each having as a label a respective one of said second images and selectively operable at the end of the said predetermined length of time, and means for indicating correspondence and non-correspondence between the label of the selected key of the second set and the image displayed in the window of the said first set.

2. An educational toy as claimed in claim 1, wherein the labels of the second set of keys are illuminated by a common lamp energized at the end of the said predetermined length of time.

3. An educational toy as claimed in claim 1, wherein the display of a second image in one of the second set of windows is intermittent, a light being operative to flash on and off intermittently beneath the respective second window during the said predetermined length of time.

4. An educational toy as claimed in claim 1, wherein the first set of keys are constituted by reed relays operable by a permanent magnet movable over the said switches.

5. An educational toy as claimed in claim 1, wherein the means for indicating correspondence and non-correspondence includes means for producing an audible sound.

6. An educational toy as claimed in claim 1, wherein the means for indicating correspondence and non-correspondence includes a toy figure movable to indicate correct correspondence.

7. An educational toy as claimed in claim 1, further comprises a shift register having a plurality of stages each connected in parallel with a respective one of the keys of said first set and connected to be shifted with each actuation of a key of said second set.

8. An educational toy as claimed in claim 7, further comprising a counter for indicating the number of correct and incorrect actuations of the keys of said second set.

9. An educational toy as claimed in claim 1, wherein the first and second images and the labels of the second set of keys are carried on a card, the card being supported on the toy in a manner to be interchangeable with other cards carrying different images.

10. An educational toy which includes a display panel and an image carrier movable relative to the display panel, wherein the image carrier is formed with a plurality of sections each having a first image, a second image associated with the first image, and a plurality of third images of which only one corresponds to the second image and wherein the display panel is arranged to display the images on the image carrier section by section and includes a first window area for displaying the first image, a second window area for displaying the second image, a third window area for displaying the said plurality of third images and a plurality of keys each associated with a respective one of the plurality of third images and arranged to be depressed by the user to test for correct assimilation of the information in the images, means being provided for indicating correspondence between the image associated with the selected key and the said second image.

11. An educational toy as claimed in claim 10, wherein means are provided for enabling the images in the second window area and the third window area to be displayed sequentially but not simultaneously.

12. An educational toy as claimed in claim 11, wherein the said means comprise light sources which are energized sequentially.

13. An educational toy as claimed in claim 11, wherein the said means comprise a flap pivotably mounted on the display panel to expose only one of the second and third window areas.

14. An educational toy as claimed in claim 10, wherein the film carrier is formed of an insulating material and is arranged to pass between contacts associated with the said keys and is provided with an aperture only alongside the third image corresponding to the second image whereby only the contacts of the key associated with the correct one of the third images may be brought together upon manual actuation of the associated key.

15. An educational toy as claimed in claim 14, wherein a further set of contacts is provided on the display between which contacts the image carrier is inserted, the image carrier being formed with further apertures which are arranged such that the said further contacts are closed when each section is aligned with the windows of the display panel.

16. An educational toy as claimed in claim 10, in which the image carrier is in the form of a wound tape.

17. An educational toy as claimed in claim 10, in which the image carrier is a rotatable disc.

18. An educational toy as claimed in claim 10, in which a counter is provided for indicating the number of correct and incorrect actuations of the said keys.

* * * * *